United States Patent [19]

Petch et al.

[11] Patent Number: 5,781,593
[45] Date of Patent: Jul. 14, 1998

[54] METHODS AND APPARATUS FOR VOCODER SYNCHRONIZATION IN MOBILE COMMUNICATION NETWORK

[75] Inventors: Bryan K. Petch, Elbert; Charles L. Lindsay, Monument, both of Colo.

[73] Assignee: Omnipoint Corporation, Colorado Springs, Colo.

[21] Appl. No.: 746,700

[22] Filed: Nov. 14, 1996

[51] Int. Cl.$^6$ ................................................ H04L 7/00
[52] U.S. Cl. .................................... 375/354; 370/503
[58] Field of Search .......................... 375/354, 362, 375/363; 370/503, 509, 529; 455/502

[56] References Cited

U.S. PATENT DOCUMENTS

| | | | |
|---|---|---|---|
| 4,312,070 | 1/1982 | Coombes et al. | 375/356 |
| 4,384,307 | 5/1983 | Kuzmik et al. | 375/220 |
| 4,507,779 | 3/1985 | Barner, Jr. et al. | 370/505 |
| 5,239,671 | 8/1993 | Linquist et al. | 455/33.1 |
| 5,414,796 | 5/1995 | Jacobs et al. | 704/221 |

OTHER PUBLICATIONS

"Air Interface Considerations." Joint Experts Meeting. Rockwell Int'l. Nov. 9, 1992.

*Primary Examiner*—Don N. Vo
*Attorney, Agent, or Firm*—Lyon & Lyon LLP

[57] ABSTRACT

In a communication network, a synchronized over-the-air (OTA) time slot of a base station's polling loop is acquired by a remote station seeking to initiate contact with that base station, such that periodic voice frames may thereafter be transmitted at known intervals between respective radio interfaces of the remote and base stations. A vocoder in the respective remote station is then synchronized to the established remote station OTA slot timing and a vocoder associated with the respective base station is separately synchronized to the established base station OTA slot timing, wherein each respective vocoder transmits and receives voice frames across full-duplex serial interface to and from its radio interface including a locally generated synchronization ("sync") pattern appended in front of a selected number of coded (i.e., compressed) bearer information and control bytes.

8 Claims, 3 Drawing Sheets

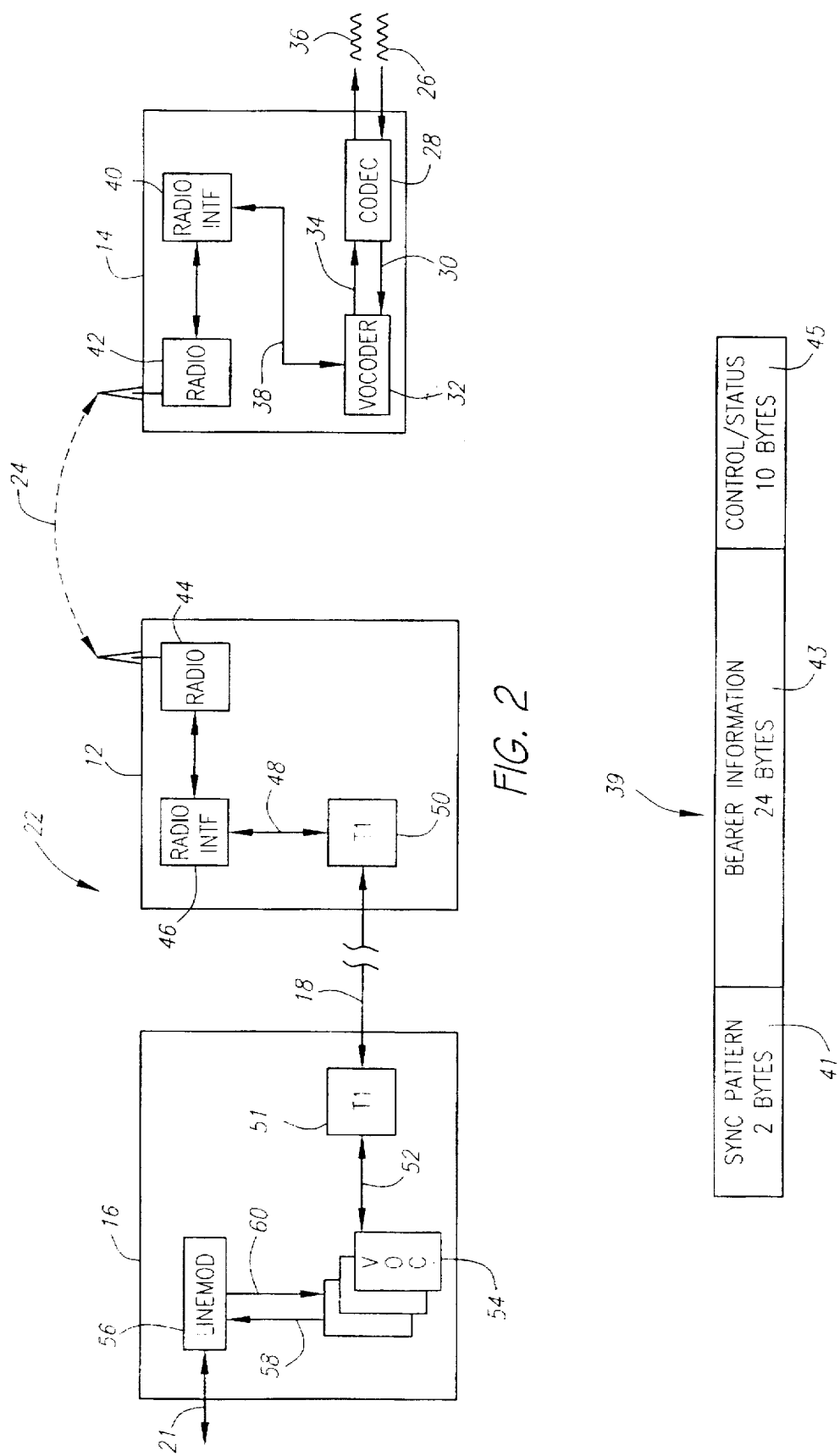

METHODS AND APPARATUS FOR VOCODER SYNCHRONIZATION IN MOBILE COMMUNICATION NETWORK

FIELD OF INVENTIONS

The inventions herein pertain to the field of communication networks, including methods and apparatus for vocoder synchronization between components of a wireless communication network.

BACKGROUND

In a typical wireless communication network, one or more base stations are selectively positioned within respective, defined geographic areas or "cells," and are used to transmit and receive communication signals to and from, respectively, one or more remote stations, (e.g., mobile or cellular telephone handsets), located within the respective cell. In particular, the base stations act as both intermediary points by which a communication path may be periodically established and maintained with respective remote stations, as well as end points of a hierarchial stationary network, which also includes an overlay or backbone network, such as, e.g., a public switched telephone network ("PSTN").

A selected communication protocol defines a method in which the various remote stations can communicate with one or more base stations of the communication network, e.g., in order to place and receive telephone calls. The communication protocol will preferably provide air-channel agility between respective base stations and remote stations, while also providing a secure voice or data link. A fundamental concern of the selected communication protocol for a network is the ability of the remote stations to communicate with the base stations in a simple, flexible and rapid manner, e.g., so that a remote station is not required to wait to establish a communication path, and/or so that a hand-off of an active call between base stations in a mobile network is transparent to a respective remote station. In this respect, the ability to acquire and maintain voice-path synchronization between a base station and a remote station is an important consideration.

In a typical digital communication network, analog voice signals are converted to a digital data stream for network transmission by pulse code modulation ("PCM") sampling at a basic telephony rate of 8 KHz by a digital coder/decoder ("CODEC") unit. Because the nominal bit rate of digitized voice transmitted over a terrestrial network is typically greater than the available over-the-air bit stream bandwidth over a wireless communication link between a respective base and remote station pair, the PCM voice bit stream is typically coded by a digital processor generally referred to as a vocoder (i.e., "voice coder/decoder") for over-the-air transmission. At the receiving end, the data is then decoded by a similar vocoder.

In general, the vocoder in the transmit direction compresses the digitized speech transmitted at a first (relatively high) bit rate into a second (relatively low) bit rate signal by encoding techniques, typically by removing all of the natural redundancies inherent in speech. This reduces the amount of information required to be sent over the air in a wireless communication network. Conversely, in the receive direction, the vocoder decompresses the received data into its original form, for further transmission and/or conversion back to analog form. A more specific background description of vocoders used in mobile communication networks is provided in U.S. Pat. No. 5,414,796, entitled, "Variable Rate Vocoder," issued to Jacobs et al.

In a time division multiple access ("TDMA") based digital communication system, it is common that the coded (or compressed) voice data is transmitted over-the-air between respective base and remote stations in short, transmission bursts, wherein a fixed quantity or "frame" of data is serially transmitted during each transmission burst. The data frame typically includes both bearer information—e.g., compressed PCM voice, and overhead information—e.g., control bits and signalling D channel and/or error correction or parity bits.

To establish and maintain a voice path link for sending and receiving "voice frames," the transmission and reception of data by the respective base and remote station vocoders are typically synchronized. This is typically accomplished by serial in-band transmission of a synchronization data pattern preceding the transmission of other data, which is generated by the vocoder at one end and recognized by the vocoder at the other end. In particular, this serial synchronization pattern is typically included in the over-the-air voice path and may consist of either several bits transmitted in a single voice frame, or, alternately, of only a very few bits per voice frame. The latter option reduces the over-the-air bandwidth impact on each frame, but requires that several consecutive voice frames be transmitted and acquired before synchronization can be established, resulting in overall transmission delays. In either case, over-the-air transmission bandwidth must be employed for vocoder synchronization, thereby reducing the available over-the-air bearer data capacity.

Further, although the transmission of additional synchronization data within a respective remote station or base station does not, in itself, result in a serious voice path bandwidth constraint, such additional overhead taken from the much more limited over-the-air transmission voice frame capacity in a TDMA based system is not desirable. Since the over-the-air path is traditionally more prone to transmission errors than wire-based transmission, this additional overhead subjects the entire voice frame to a greater likelihood of failure.

Thus, it would be desirable to be able to accomplish vocoder synchronization as fast as possible and with minimal impact on over-the-air bandwidth. In this regard, it should also be considered it is further desirable to locate the base station vocoder in a location remote from the actual base station—e.g., in a remotely located base station controller. This is to allow digital backhaul (e.g., at T1 or higher rates) of the compressed voice data as far uplink as possible, as well as to allow a single, remotely located vocoder to support multiple voice channels from multiple base stations, respectively, for increased network efficiency. For example, a respective base station vocoder handling a given voice link with a particular remote station may actually be one of several vocoder voice channels running on a single digital signal processor ("DSP"), which is one out of a large bank of DSPs serving multiple base stations over a wide network area.

Thus, it is further desirable to provide synchronization between respective remote station vocoders and remotely located base station vocoders.

SUMMARY OF THE INVENTIONS

The present inventions provide a network architecture and signaling protocol for acquiring and maintaining vocoder synchronization between components of a wireless communication network in a manner which does not require over-the-air bandwidth, works equally well whether the base station vocoder is provisioned locally or remote, and can be accomplished within a single voice frame.

In a preferred embodiment, a synchronized over-the-air channel or "time slot" within a base station's polling loop is acquired by a remote station seeking to initiate contact with that base station, wherein periodic voice frames may thereafter be transmitted at known intervals between respective radio interfaces of the remote and base stations. During each occurrence of the respective acquired polling loop time slot, the respective base and remote stations are allotted their own transmission interval, or "OTA slot." According to a general aspect of the present inventions, a vocoder in the respective remote station is synchronized to the established remote station OTA slot timing and a vocoder associated with the respective base station is separately synchronized to the established base station OTA slot timing.

In particular, during each occurrence of the respective time slot in the polling loop, e.g., every 20 msec in a preferred embodiment, a remote station voice frame is transmitted and received by the respective remote station vocoder across full-duplex serial interface or serial backhaul, if remotely located, to and from the remote station's radio interface, and a base station voice frame is transmitted and received by the base station vocoder across full-duplex serial interface to and from the base station's radio interface, wherein the respective remote and base station voice frames each include a locally generated synchronization ("sync") pattern appended in front of a selected number of coded (i.e., compressed) bearer information and control bytes.

To establish a synchronized communication link in a preferred embodiment, each respective vocoder scans the incoming data received over the serial interface from its respective radio interface, searching for the respective sync pattern. Upon detecting the sync pattern, the respective vocoder processes the ensuing serial data as the bearer and control information of a respective new voice frame.

In preferred embodiments, upon initially detecting the respective synch pattern, a respective remote or base station vocoder resets internal buffers located on both compressed and non-compressed data interfaces and begins a new voice frame cycle. In the "encode direction," a new buffer of non-compressed PCM voice data will be acquired, a previous buffer of PCM voice data will be encoded, and a buffer of currently encoded PCM voice data will be delivered to the respective radio interface starting with the next serial clock. In the "decode direction," the next serial clock will deliver the first bit of a new voice frame. When the frame is completely received, it is decoded and is immediately transmitted serially to a respective CODEC, if in the remote station, or line/trunk interface card, if in the base station or base station controller.

After the respective vocoder transmits and receives the proper number of voice frame bits, it expects the next data it receives to be the respective synchronization pattern of the next voice frame. If so, then the respective vocoder processes the ensuing voice frame in the same manner as the previous voice frame. This process is repeated until the synchronization pattern is not detected in its expected frame sequence location, indicating that a synchronization problem has occurred, e.g., due to a hand-off of a call to a new time slot on the same, or another base station. When this occurs, the respective vocoder returns to scanning incoming data for the synchronization pattern.

In preferred embodiments, each respective vocoder preferably mutes its non-compressed output while scanning for the synchronization pattern, or whenever a synchronization error is detected. The respective radio interface also preferably mutes the vocoder output via a serial control bit whenever a synchronization change is required.

In accordance with another general aspect of the present inventions, the synchronization patterns and control information are preferably stripped from the respective remote and base station frames at the respective radio interfaces, wherein only the bearer information is transmitted over-the-air in either direction. In this manner, end-to-end voice frame synchronization is accomplished without transmitting serial synchronization patterns over the air between the two vocoders. An advantage of this aspect of the invention is that the vocoder synchronization is more robust than in prior approaches, as the synchronization bit patterns are not subject to over the air transmission errors.

In embodiments in which information is received from a multiplexed backhaul channel, synchronization patterns generated by a network vocoder are used to establish the beginning of a frame.

In alternate preferred embodiments where the base station vocoder is located in a remote location from the respective base station radio interface, such as at a centralized base station controller, the complete voice frame, i.e., including the synchronization and control information, is transmitted from the radio interface to the respective vocoder across a digital backhaul facility. This may require an additional delay to account for the additional data transmission interval. These and other objects, aspects, advantages and features of the present inventions will be more fully understood and appreciated by those skilled in the art upon consideration of the following detailed description of preferred embodiments, presented in conjunction with the accompanying drawings.

BRIEF DESCRIPTION OF THE DRAWINGS

The drawings illustrate both the design and utility of preferred embodiments of a communication network and its component elements embodying the present inventions, in which:

FIG. 2 is a block diagram of an exemplary end-to-end voice path in an exemplary communication link between respective remote and base stations of a preferred wireless communication network;

FIG. 3 is a block representation of a preferred voice frame according to a preferred remote station and base station serial interface;

DETAILED DESCRIPTION OF THE PREFERRED EMBODIMENT

Figure 1:
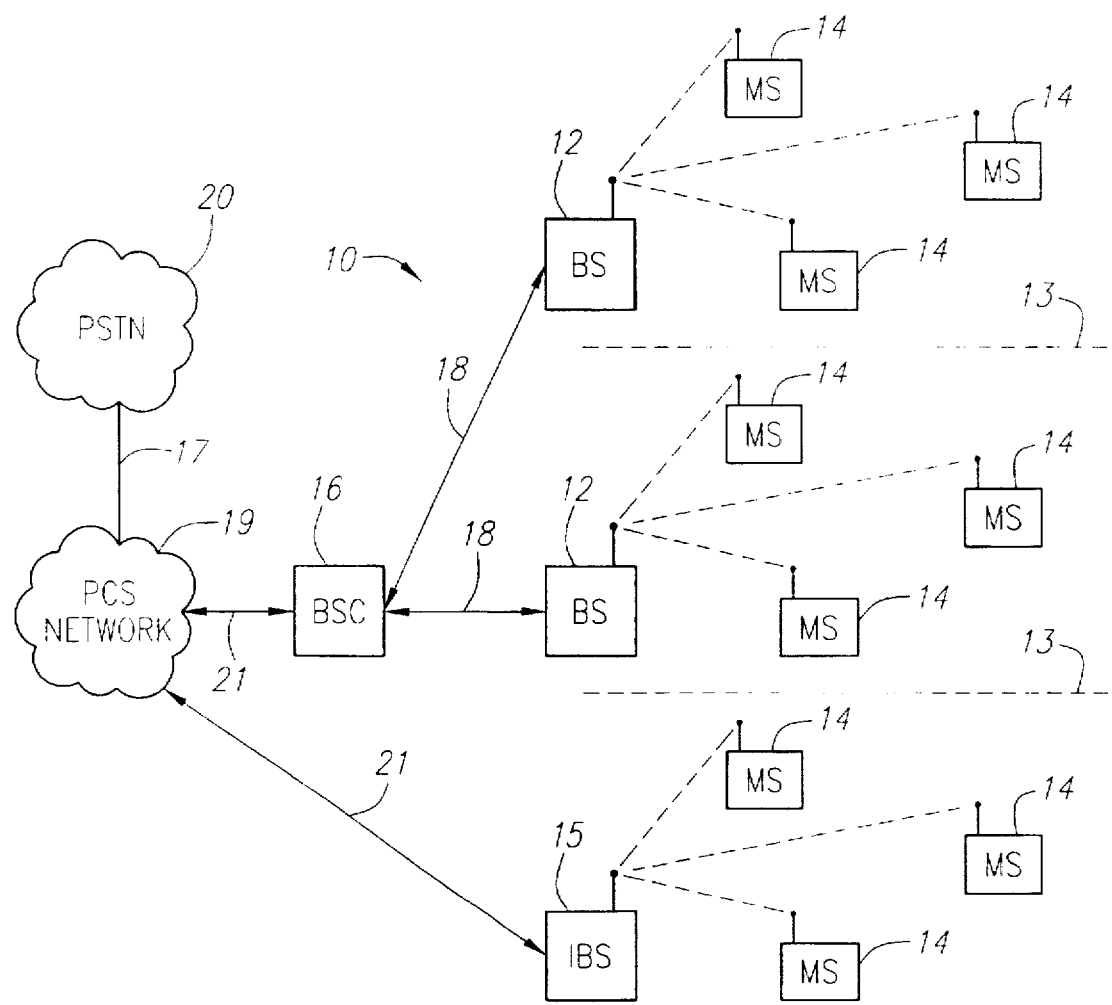
FIG. 1 is a block diagram of an exemplary wireless communication network, such as a public switched telephone network ("PSTN")

Referring to FIG. 1, an exemplary communication network 10 includes a plurality of base stations 12, which may include one or more intelligent base stations 15, wherein each base station 12 and intelligent base station 15 is located within a respective geographic cell defined by cell boundaries 13. A plurality of independent (activated) remote stations 14 are distributed throughout the network 10, with multiple remote stations 14 typically located in a particular geographic cell at any given instant. The remote stations 14 may be mobile handsets or fixed customer premises remote units. While the inventions are described with reference to a voice application, the inventions are equally applicable to data applications.

The base stations 12, the intelligent base station 15 and the remote stations 14 each preferably comprise a radio transmitter and receiver, and preferably communicate with one another using a combination of time division multiple access ("TDMA"), frequency division multiple access ("FDMA"), and code division multiple access ("CDMA") transmission techniques, respectively, preferably by employing a spread spectrum encoding format. For example, TDMA is preferably used to separate users within each geographic cell location. To provide greater area of coverage, or to provide greater capacity for densely populated regions, multiple or "sectorized" cells may be deployed using FDMA, thus separating cells by frequency. Further, to permit multi-cell deployments in a given region, CDMA may be used for each "RF link," (i.e., each over-the-air radio frequency signal link), in order to reduce co-channel interference between nearby cells using the same RF carrier frequency. Spread spectrum may advantageously improve system response to RF channel impairments. Both FDD and TDD may be employed with any of these multiple access techniques.

In particular, the respective base stations 12 and intelligent base station 15 are used to perform the requisite over-the-air radio transmission and reception to remote stations 14 located within its cell area, and will contain the equipment needed to communicate with the respective remote stations. In this regard, a base station 12 supports the over-the-air, terrestrial, and signaling links, respectively, necessary for fully linking a remote station 14 to an overlay network 20, such as, e.g., a public switched telephone network ("PSTN") through personal communications switching ("PCS") network infrastructure 19 via interface 17. A base station 12 is connected, via back haul lines 18, to a respective base station controller ("BSC") 16, which preferably controls the two-way transmissions of a plurality of base stations 12 in order to more efficiently provide certain operations such as, e.g., call handoffs between base stations, bearer data encoding and decoding, as well as general OAM&P ("operations, administration, maintenance & provisioning") support functions. An intelligent base station 15 is intended herein to describe a base station which incorporates the features of both a standard base station 12 and a base station controller 16, respectively, in a single unit. The respective base station controllers 16 and intelligent base stations 15, in turn, are connected to the overlay network 20 via further back haul lines 21. In a typical preferred embodiment, an overlay network 20 will be connected to a multitude of base stations 12, either by way of a (smaller) number of base station controllers 16 or directly, where intelligent base stations 15 are employed. The respective back haul lines 18 and 21 are preferably dedicated (e.g., private or leased public), two-way DS0, DS1 or DS3 level facilities, depending on the particular traffic load requirements of the specific portion of the communication network 10.

To communicate with multiple remote stations 14 in its respective geographic cell, each base station 12 and intelligent base station 15 preferably employs over-the-air loop comprising a number of individual air channels, or "time slots", wherein each time slot may be used by a remote station 14 to communicate with the respective base station 12 and intelligent base station 15. In accordance with a preferred communication protocol an FDD protocol such as that embodied in the GSM standards may be employed. In accordance with another preferred communication protocol, a time division duplexing ("TDD") transmission mode technique is preferably employed, whereby both downlink—i.e., in the base station to remote station transmission direction— and uplink—i.e., in the remote station to base station transmission direction—transmissions are carried over a common communication frequency path by employing time intervals for each respective signal transmission within a given time slot.

For example, in an exemplary preferred network embodiment employing a TDMA/TDD frame and time slot structure based on a 20 millisecond (ms) over-the-air loop and employing 2.5 Mega "chip" per second (Mcps) transmission rate, the 20 ms over-the-air loop is equally divided between 16 full duplex channels, with each resulting time slot channel being capable of supporting 9.6 Kbps full duplex digital data transmission between the respective base and remote stations. The first portion of each time slot channel is preferably allocated for a remote station frame transmission, and the second portion is preferably allocated for a base station frame transmission, respectively. After each respective base or remote frame transmission, a small portion of the time slot is preferably allocated to allow sufficient guard time for the transmitted signal to propagate back and forth to the respective receiver, e.g., based on the projected maximum geographic cell radius. In other words, even if there were perfect synchronization between respective base and remote station transmission intervals, a guard time is still preferred to minimize the possibility of received and transmitted signals overlapping in time due to the varying transmission distances and atmospheric conditions within the geographic cell location.

Preferably, any time slot in over-the-air loop of a given base station 12 or intelligent base station 15 that is not already seized by a remote station 14 may contain a general poll command message transmitted by the respective base station 12 or intelligent base station 15 in that time slot's base station transmit interval. To acquire a time slot, a remote station 14 responds to a received general poll message in a remote station transmit interval. Upon receiving the response, the respective base station 12 or intelligent base station 15 may send a specific poll message in the next appearance of the same time slot in the over-the-air loop, which preferably includes a time slot (or time slots) assignment for communication between the remote station 14 and the base station 12 or intelligent base station 15, which may or may not be the same time slot used to transmit the general poll command message.

Referring to FIG. 2, in a manner described and disclosed in U.S. patent application Serial No. (not yet assigned), Attorney Docket No. 211/238, filed on even date herewith, and owned by the assignee of the present application, which is fully incorporated by reference herein, a synchronized communication path 22 between a respective remote station 14 and a respective base station 12 is preferably acquired and maintained via an over-the-air (OTA) time slot 24 of the over the air loop of the respective base station 12. In particular, the transmission timing of the respective base station 12 is synchronized to the overlay network 20, and the respective transmission timing of the remote station 14 is synchronized to the base station 12, respectively, so that periodic voice frames may thereafter be transmitted in each direction over the acquired time slot during the respective base and remote station transmit intervals. A general description of a voice path through the communication link 22 follows, where, for purposes of uniformity, transmission in the remote station-to-base station direction is referred to herein as "uplink" transmission, and transmission in the base station-to-remote station direction is referred to as "downlink" transmission.

In the uplink direction the remote station 14 transmits an analog (voice) signal 26, which is preferably converted by a CODEC circuit 28 into an uplink PCM data stream 30, preferably at a basic digital telephony rate of 64 Kbps. The uplink PCM data stream 30 is input into a remote station vocoder 32, which preferably encodes the PCM data in accordance with a selected voice compression algorithm, and then transmits the encoded PCM data in a series of respective uplink voice frames over a full duplex bus 38 to a remote station radio interface circuit 40, wherein a single voice frame is transmitted from the radio interface circuit 40 to the radio 42 during each remote station transmit interval of the respective acquired OTA time slot 24.

Likewise, in the downlink direction, respective downlink voice frames are transmitted from the remote station radio 42 to the radio interface circuit 40 during each base station transmit interval of the respective acquired OTA time slot 24. The encoder data is then transferred from the radio interface circuit 40 to the vocoder 32 via bus 38. The respective downlink voice frames are decoded by the vocoder 32 into a downlink PCM data stream 34, preferably having the same transmission rate as the outgoing PCM data stream 30—i.e., 64 Kbps. The downlink PCM data stream 34 is then converted into an analog (voice) signal 36 by the CODEC 28, which is received by the operator (not shown).

More particularly, referring to both FIG. 2 and FIG. 3, the respective uplink and downlink voice frames transmitted over bus 38 are configured in accordance with a preferred 14.4 Kbps to 16 Kbps serial interface defined for transmission between the vocoder 32 and radio interface circuit 40, respectively. In accordance with this preferred serial interface, each voice frame 39 begins with a two byte sync pattern 41, which is preferably selected so as to not be likely to represent bearer data, such as, e.g., preferably C3 hex (11000011) and A5 hex (10100101). The sync pattern 41 is followed by twenty-four bytes of bearer information 43—i.e., for a bearer data transmission rate of 9.6 Kbps in a preferred network employing a 20 msec base station polling loop equally divided between 16 full duplex OTA channels. The bearer information bytes 43 are followed by ten to fourteen bytes of (non-compressed) control and status bytes 45, which are used for sending overhead and system level information between the respective remote station vocoder 32 and radio interface circuit 40.

In a preferred embodiment, the bearer information 43 includes both encoded voice and error correction data in accordance with the selected algorithm employed by the vocoder 32. In alternate preferred embodiments, the bearer information bytes 43 transmitted between the vocoder 32 and radio interface circuit 40 only include encoded voice, with the error correction information added to uplink voice frames or deleted from downlink voice frames, respectively, at the remote station radio interface circuit 40. In either case, however, the preferred serial interface includes a twenty-four byte bearer information field 43 in each voice frame 39 transmitted in either direction between the respective vocoder 32 and radio interface circuit 40. In an alternative preferred embodiment the control/status information may precede the bearer information.

In the uplink direction, the sync pattern bytes 41 and control and status bytes 45, respectively, are preferably stripped from each voice frame at the remote station radio interface circuit 40, with the twenty-four bytes of bearer data 43 transmitted over OTA slot 24 by a remote station radio 42 during the respective remote station transmit interval. Likewise, in the downlink direction, a respective twenty-four bytes of bearer data (also designated as 14311) is preferably received by the remote station radio 42 during each base station transmit interval. The received (downlink) bearer data bytes 43 are forwarded to the remote station radio interface circuit 40, which preferably appends the two byte sync pattern 41 in front of, and adds ten control and/or status data bytes 45 behind, respectively, the received bearer data bytes 43, to thereby form a complete downlink voice frame 39 in accordance with the defined serial interface.

At the base station end of the communication link 22, a base station radio 44 receives the twenty-four bytes of uplink bearer data 43 transmitted from the remote station 14 over the OTA channel 24 during the respective remote station transmit intervals, and forwards the data to a base station radio interface circuit 46. The two byte sync pattern 41 is added in front of, and ten control and/or status data bytes 45 are appended behind, respectively, the received uplink bearer data bytes 43 from the remote station 14, to thereby reform a complete uplink voice frame.

The uplink voice frames 39 are transmitted over a duplex bus 48 from the base station radio interface circuit 46 to a T1 interface module 50, which relays the respective voice frames 39 over a backhaul facility 18 to a corresponding T1 module 51 located at a respective base station controller (BSC) 16 or other network subsystem. From the BSC T1 module 51, the uplink voice frames 39 are preferably forwarded over a BSC duplex bus 52 to an assigned vocoder 54, which is one of several vocoders located at the BSC 16. The respective uplink voice frames 39 are decoded by the vocoder 54 into a (non-compressed) PCM data stream 58 having the same transmission rate as the remote station PCM data stream 30—i.e., preferably at 64 Kbps. The PCM data stream 58 is then preferably transmitted to a respective BSC line module 56 for further routing, e.g., over backhaul facility 21 to the overlay network 20.

In the downlink direction, a downlink PCM data stream 60, which carries downlink bearer information intended for the respective remote station 14 via communication link 22, is transmitted from the BSC line module 56 to the respective vocoder 54. The vocoder 54 encodes the downlink PCM data from signal 60 in accordance with a selected voice compression algorithm and outputs the encoded data in a series of respective downlink voice frames 39, which are transmitted over duplex bus 52 to the BSC T1 module 51. The BSC T1 module 51 relays the downlink voice frames 39 to the respective base station T1 module 50, via the backhaul facility 18. From the base station T1 facility 50, the downlink data frames 39 are forwarded over bus 48 to the base station radio interface 46, which strips off the respective sync pattern bytes 41 and control and status bytes 45, with the twenty-four bytes of bearer data 43 of each downlink frame transmitted over OTA slot 24 during the respective base station transmit interval. The control and status bytes 45 are monitored by the protocol processor and appropriate control traffic messages are sent as part of the protocol (e.g. DTMF).

To initially acquire and thereafter maintain vocoder synchronization, preferably after a synchronized OTA channel 24 has been acquired, the respective remote and base station vocoders 32 and 54 will each send respective uplink and downlink voice frames 39 during the respective remote and base station transmit intervals of the acquired time slot.

Preferably at the same time, both vocoders 32 and 54 scan the respective incoming data, to detect the sync pattern 41. Upon detecting the sync pattern bytes 41, the respective vocoder 32 or 54 processes the ensuing thirty-four bytes of serial data as the initial bearer and control information, respectively, of a respective new incoming voice frame 39.

Figure 4:
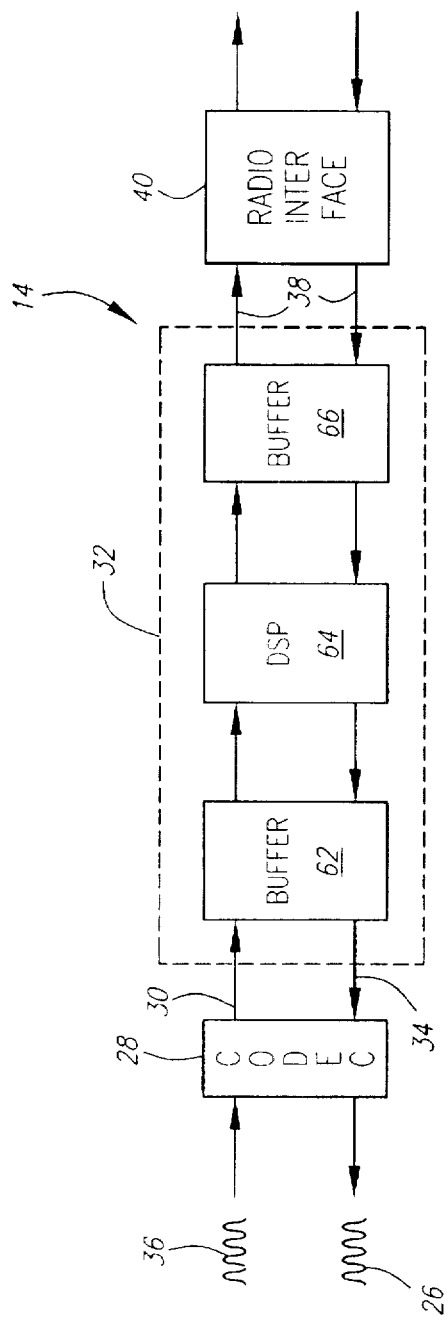
FIG. 4 is a block diagram of the voice path in a preferred remote station.

More particularly, referring to FIG. 4, the remote station vocoder 32 includes a first (non-encoded) data interface buffer 62, a digital signal processor ("DSP") 64 and a second (encoded) data interface buffer 66, respectively. Buffer 62 stores PCM data to be encoded from data stream 30 and recently developed PCM data to transmit as data stream 34, buffer 66 stores bearer data received from the radio interface circuit 40 to be decoded and encoded data to be transmitted to the radio interface circuit 40, and the DSP 64 performs the actual encoding and decoding, respectively.

Upon initially detecting the synch pattern 41, the remote station vocoder 32 resets respective counters (not shown) associated with the buffers 62 and 66, and begins a new voice frame cycle. In the "encode" direction, a frame's worth (the actual number of bytes or bits, in the frame will vary depending on the compression ratio by the vocoder) of (non-compressed) data from PCM data stream 30 will be acquired in buffer 62, a frame's worth (again the actual number of bytes or bits, in the frame will vary depending on the compression ratio by the vocoder) of (non-compressed) PCM data previously stored in buffer 62 will be received and encoded by DSP 64 into twenty-four bytes of bearer data, and twenty-four bytes of previously encoded bearer data is delivered from the buffer 66 to the remote station radio interface 40, respectively, along with the newly inserted synch pattern 41 and control bytes 45. In the "decode direction," the next serial clock count will deliver the first bit of bearer data of the respective incoming voice frame 39 into buffer 66. Once the bearer data bytes 41 is completely received into buffer 66, it is decoded by the DSP 64 and then transmitted serially as downlink PCM signal 34 to the CODEC 28 from buffer 62.

After the initial voice frame 39 is processed, the vocoder 32 looks for the sync pattern 41 to appear again, i.e., immediately following the initial frame 39 at the next base station transmit interval of the acquired time slot 24. If so, vocoder synchronization is established at the remote station 14 end of communication path 22. This process is repeated at each successive time slot interval, until the sync pattern 41 is not detected in its expected frame sequence location, indicating that a synchronization problem has occurred. When this occurs, the vocoder 32 returns to scanning the incoming data for the synch pattern 41 to appear at any time. The remote station vocoder 32 preferably mutes its non-compressed output while scanning for the synch pattern 41, or whenever a synchronization error is detected, e.g., by voiding the decoded downlink data rather than delivering it to the CODEC 28. The remote station radio interface 40 also preferably mutes its downlink voice frame transmissions to the vocoder 32 via a control bit whenever a synchronization change is required. To mask possible cases where the synch pattern 41 might occur randomly in the middle of a voice frame 39 synchronization changes are not made unless three consecutive frames indicate that the synchronization is not correct.

Figure 5:
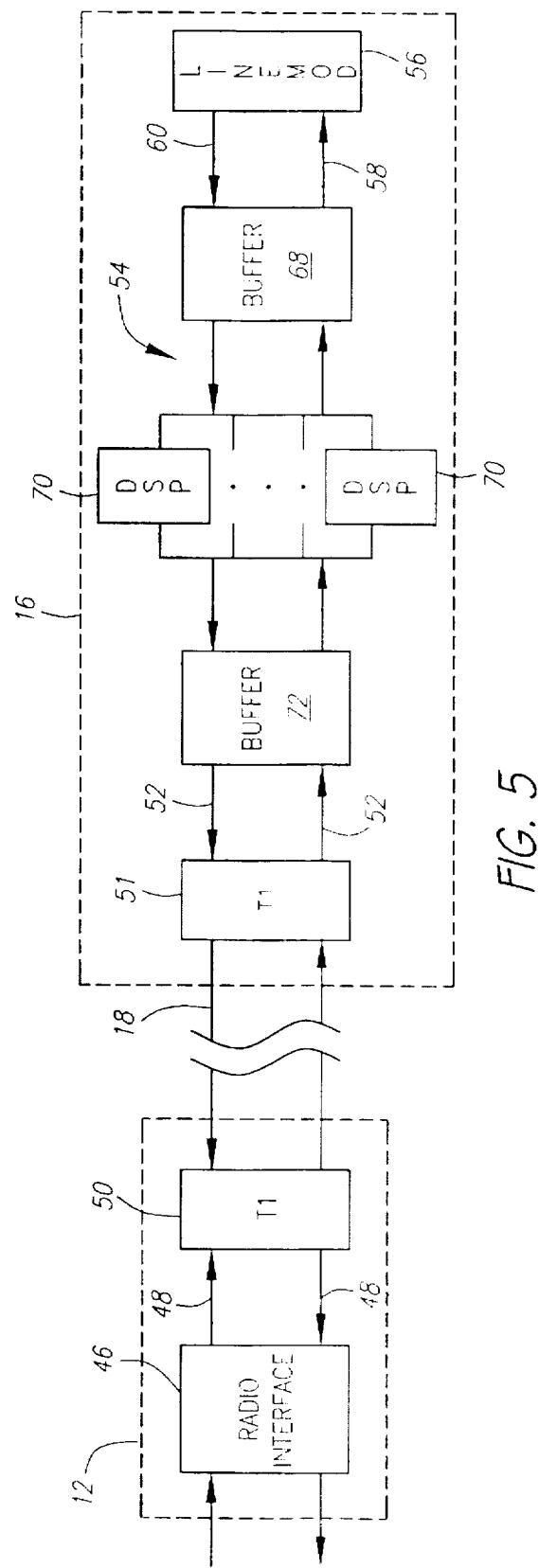
FIG. 5 is a block diagram of the voice path through a preferred base station and connected base station controller, respectively, linked by a digital backhaul facility.

Referring to FIG. 5, the vocoder 54 at the BSC 16 includes a first (non-encoded) data interface buffer 68 connected to the line modules 56, a plurality of DSPs 70 and a second (encoded) data interface buffer 72 connected to the BSC T1 module 51, respectively. Buffer 68 stores PCM data to be encoded from data stream 60 and recently developed PCM data to transmit as data stream 58, buffer 72 stores bearer data received from the base station radio interface circuit 46 to be decoded and encoded data to be transmitted to the radio interface circuit 46, and a selected DSP from the plurality of DSPs 70 performs the actual encoding and decoding, respectively, of the voice path data associated with the communication path 22.

Upon initially detecting the synch pattern 41, the selected DSP 70 resets respective counters (not shown) associated with buffers 68 and 72, and begins a (base station) new voice frame cycle. In the encode direction, a frame's worth (the actual number of bytes or bits, in the frame will vary depending on the compression ratio by the vocoder) of (non-compressed) data from PCM data stream 60 will be acquired in buffer 68, a frame's worth (the actual number of bytes or bits, in the frame will vary depending on the compression ratio by the vocoder) of (non-compressed) PCM data previously stored in buffer 68 will be received and encoded by the respective DSP 70 into twenty-four bytes of bearer data, and twenty-four bytes of previously encoded bearer data is delivered from the buffer 72 to the T1 module 51, respectively, along with the newly inserted synch pattern 41 and control bytes 45. In the decode direction, preferably the next serial clock count will deliver the first bit of bearer data of the respective incoming voice frame 39 into buffer 72. Once the bearer data bytes 41 is completely received into buffer 72, it is decoded by the DSP 64 stored in buffer 68 and transmitted serially as downlink PCM signal 58 to the line module 56. Because the vocoder 54 is remotely located from the respective base station 12, i.e., over the backhaul T1 facility 18, an extra delay of one over the air loop cycle, e.g., 20 msec is preferred for the transmission of the voice frames 39 in each direction between the base station radio interface 46 and the respective vocoder DSP 70.

Thus, methods and network architectures for the acquisition and maintenance of synchronization between vocoders on both ends of an established communication link in a remote communication network have been disclosed. For example, in a network employing a 5 Mcps transmission rate, with a 20 ms over the air loop is equally divided between 32 full duplex channels, each resulting time slot channel is capable of supporting 8 Kbps full duplex transmission between the respective base and remote stations. In this case, a bearer information field 43 of twenty bytes per voice frame 39 is preferably employed instead of twenty-four bytes.

As would be apparent to those skilled in the art, many modifications to the aforedescribed preferred embodiments are possible without departing from the inventive concepts herein. The inventions, therefore, are not to be restricted except in the spirit of the appended claims.

What is claimed is:

1. A method for synchronizing a remote station vocoder with a base station vocoder in a communication network, comprising the steps of:

obtaining a synchronized over-the-air transmission slot between a radio interface of the respective remote station and a radio interface of the respective base station;

transmitting a remote station voice frame, including both remote station synchronization data and bearer data, respectively, from the remote station vocoder to the remote station radio interface;

removing the remote station synchronization data from the remote station voice frame at the remote station radio interface;

transmitting the bearer data from the remote station radio interface to the base station radio interface in the over-the-air transmission slot;

appending base station synchronization data to the bearer data at the base station radio interface to thereby form a base station voice frame; and transmitting the base station voice frame to the base station vocoder.

2. The method of claim 1, comprising the further step of detecting the base station synchronization data at the base station vocoder to thereby establish synchronization with the remote station vocoder.

3. The method of claim 1, wherein the step of appending base station synchronization data to the bearer data at the base station radio interface is performed by adding a base station synchronization code in front of the bearer data, with respect to the data transmission order of the base station voice frame.

4. The method of claim 3, comprising the further step of monitoring data received at the base station vocoder in order to detect the base station synchronization code.

5. The method of claim 4, comprising the further steps of detecting a first appearance of the base station synchronization code at the base statio vocoder in a respective communication link between the remote station and base station, and decoding a block of the data immediately following the detected base station synchronization code received at the base station vocoder, wherein the block of data is presumed by the base station vocoder to represent bearer data transmitted from the remote station.

6. The method of claim 5, comprising the further step of monitoring data received at the base station vocoder from the base station radio interface to detect the receipt of the respective base station synchronization code on a regular interval following the detection of the first appearance of the base station synchronization code in the respective communication link between the remote station and base station.

7. The method of claim 6, comprising the further step of decoding a respective block of data received at the base station vocoder immediately following each detected base station synchronization code received at the regular interval, wherein each of the respective blocks of data is presumed by the base station vocoder to represent bearer data transmitted from the remote station.

8. The method of claim 7, comprising the further steps of voiding any data received at the base station vocoder from the base station radio interface upon failing to detect the base station synchronization code at the regular interval following the detection of the first appearance of the base station synchronization code in the respective communication link between the remote station and base station.

* * * * *